United States Patent

[11] 3,548,723

| [72] | Inventor | Karl H. Sengewald |
|---|---|---|
| | | 4801 Kunsebeck, Westphalia, Germany |
| [21] | Appl. No. | 816,625 |
| [22] | Filed | Apr. 16, 1969 |
| [45] | Patented | Dec. 22, 1970 |
| [32] | Priority | Jan. 4, 1969 |
| [33] | | Germany |
| [31] | | No. 1,900,337 |

[54] METHOD FOR MANUFACTURE OF A CARRYING BAG
11 Claims, 11 Drawing Figs.

[52] U.S. Cl. ................................................. 93/35;
156/253, 156/510; 229/54
[51] Int. Cl. .................................................... B31b 1/00
[50] Field of Search .......................................... 229/54, 53;
93/35, 35H; 156/253, 510, 554

[56] References Cited
UNITED STATES PATENTS

| 2,281,964 | 5/1942 | Wolf | 93/35X |
| 2,873,566 | 2/1959 | Sylvester et al. | 93/35X |
| 3,148,598 | 9/1964 | Davis | 93/35X |

*Primary Examiner*—Bernard Stickney
*Attorney*—Ely, Golrick and Flynn

ABSTRACT: Flattened thermoplastic tubing stock, produced with either integrally extruded or continuously adhesively- or weld-bonded, central, longitudinal reinforcement, with or without infolded longitudinal edges, is incised or punched in the reinforced region with spaced handgrip openings as the advancing stock is longitudinally slit; and by each of successive transverse seam welding severing cuts midway between the grip holes two like carrying bags result with handgrip openings in reinforced top or mouth edges. Variations are disclosed in method and product bags, with and without closures.

INVENTOR
KARL H. SENGEWALD

BY Ely, Golrick & Flynn

ATTORNEYS

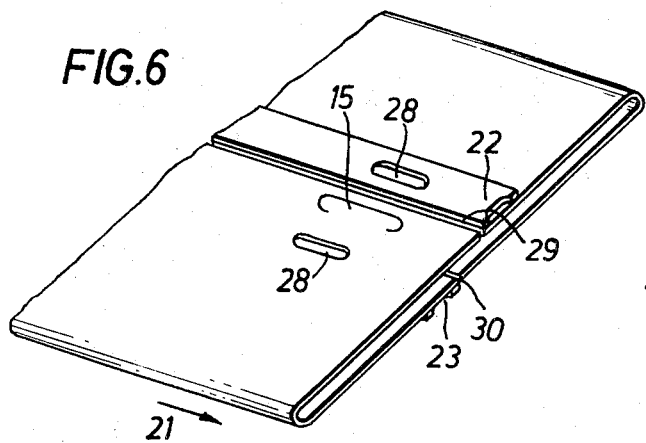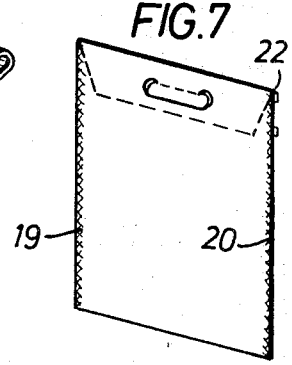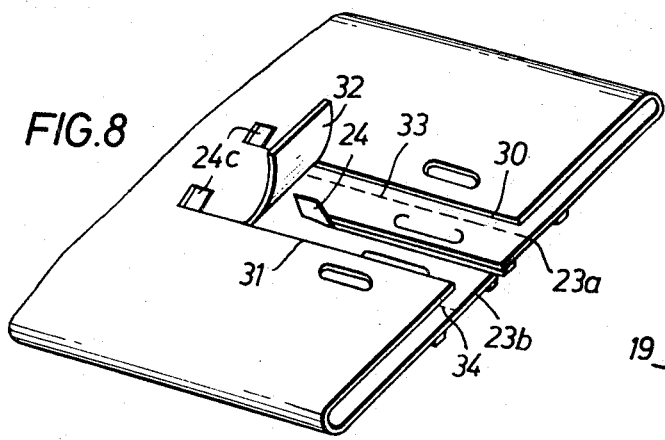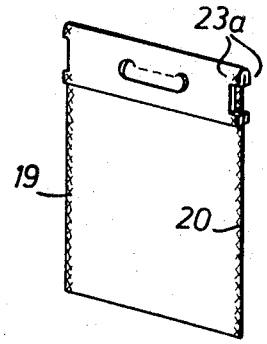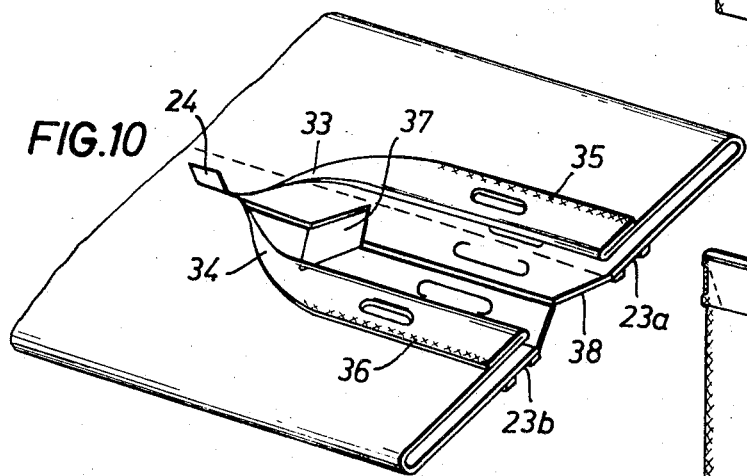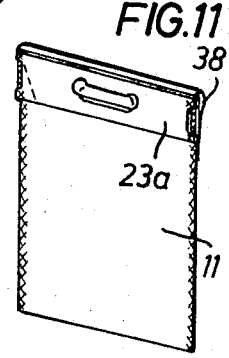

METHOD FOR MANUFACTURE OF A CARRYING BAG

A definition: In the context of this application "tube," "tubular stock" and like terminology usually will signify thermoplastic, synthetic plastic film which (though produced by extrusion with inflation to a large tubular diameter and then flattened and wound into roll form) is actually a flat sheet or stock of edge-joined double layers.

One object of the present invention is provision of a method for manufacturing bags, such as smaller purchase carrying bags, or even larger shopping bags, and the like, from synthetic thermoplastic film. Another object is to provide a method for fabricating such bags in an economic manner and with relatively simple equipment. Another object is the manufacture of bags of the described type in the quite economic fashion and by a method of operation always producing two bags. Another object is to provide such a bag having its top or mouth reinforced on one or both walls and provided with a sheared-out handgrip opening in the reinforced region. A still further object is to provide a tube section adapted to use in manufacturing bags of the character described.

Other objects and advantages will appear from the subsequent descriptions and from the drawings.

For the attainment of these objects, in accordance with the invention, to produce a bag of the above-described type from flattened thermoplastic tube stock, there is continual application, along the middle longitudinal axis of and on at least one wall or layer of the advancing stock, of a wide reinforcement strip, or of two small reinforcement strips spaced from each other parallel to that axis, which are bonded to or with the tube wall or layer; for example, cemented in place by a lamination cementing device; and the tube is continuously slit for a central division of the reinforcing strip, or a separation between the two spaced strips; and finally successive severance of paired finished product bags, through a transverse weld seaming with a transverse severing.

Preferably, the reinforcement material is also thermoplastic band or strip, stiffer than the tubing stock, as thermoplastic seaming and/or severance is readily carried out in the process; but also other stock may be used such as paper, thin or flexible cardboard which itself may have a laminated plastic surface, or other material which may be bonded to the tubing by suitable adhesives, or at times by thermoplastic adherence of the tubing itself to nonthermoplastic reinforcement stock.

The basic process of the invention is particularly advantageous, especially since only known simple mechanical devices or apparatus are necessary for its practice. In manufacture of the above-described bag designs, the reinforcing strips can be applied on both sides of the tubing; but also the reinforcing strips may be applied to both sides of the tube, and laterally offset from one another with the tube being continually slit between the adjacent edges of the reinforcing strips.

By this proposal, with the same basic production equipment it is possible to produce bags of varying construction in the grip edges of the mouth region. Thus a bag can be made with reinforcing strips in its hand-grasped mouth edges, which connectively close the bag mouth on its upper edges; or a bag with mouth flap and also grip-edge reinforcement on one wall; or a bag with an overflap and additionally grip-edge reinforcing on both sides of the mouth.

In accordance with a further feature of the invention, the tube is infolded on both longitudinal edges which become ultimately the bottoms of finished bags.

Further in reinforcement along the longitudinal midaxis on one or both tube walls, grip holes through the tube are punched out or incised entirely through the wall and reinforcement layers on both sides of the axis arranged in mirror image relation to each other in pairs, with the tube with its reinforcements being then continually cut along the midaxis, before division into two opposed bags by the transverse seam welding cuts.

The inventive method, for simultaneously producing two opposed bags, can be carried out by various means including a tube stock feeding or advance mechanism, a seam welding arm, and a double-acting device for incising and stamping out of the grip holes.

Further of tube serving as starting stock can be produced by extrusion with side folds; and, along the longitudinal midaxis on both sides of the tubing, with inwardly raised on projecting flat reinforcements as flat longitudinal opposed lands. A starting or stock tube of such a form can be wound well into a roll, when the middle reinforcements on the respective tube walls are not thicker than the thickness of the side folds, since the same total thickness at the middle and at both edges presents no difficulty to winding of the tube into a supply roll. A tube thus formed can then be simply processed from such a supply roll on a bag-making apparatus including the indicated simple devices with obvious multiple advantages.

Also in accordance with another inventive aspect, at locations spaced correspondingly to product bag width longitudinally along the reinforcement stock, there are cut out of and extending transversely to the reinforcing strip stock, elongated holes which singly or in aligned pluralities extend substantially over the width of the reinforcing strips; and the transverse seam welding and severing cuts for separation of the finished bags from the tube) are made with facility along the longitudinal axis of these elongated cutouts.

In accordance with a further variation of the invention, with disposition of two spaced reinforcing strips on only one side of the tube, the edge strips of the tubing wall opposed to the reinforcing strips, obtained through the middle longitudinal cut of the tube, may be folded over in an outward direction onto, and through longitudinally carried cementing or seam-welding be bound to, the tube wall to form an edge reinforcement.

The aforementioned series of steps need not take place precisely in the order as given. Thus, for example, it is possible to form the side folds on both edges of the tube before the application of the reinforcing strips. Also the tube with the reinforcing strips along its longitudinal axis may be first longitudinally cut, and thereafter provided with the paired grip hole punch outs or incisions; although it is particularly advantageous first to make the two opposed gripping hole punchouts and only then to make the longitudinal cut between the two holes in the longitudinal midaxis of the tube and the reinforcing strips.

The invention is more fully explained in the drawings with respect to two detailed examples. It is not limited to the represented examples, embodiment forms, but rather there are further modifications possible lying within the scope of the invention.

Figure 3:
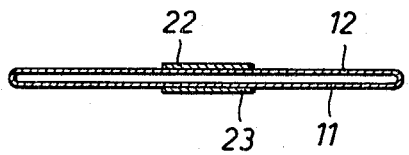
FIG. 3 is a cross section through thermoplastic tube stock in process taken along the line III–III in FIG. 2.
Figure 5:
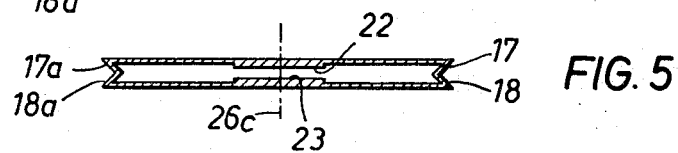

FIG. 5, in section similar to FIG. 3, represents an extruded tube with side folds and, as reinforcing strips, flat lands formed integrally on and raised inwardly toward each other on each tube wall;

FIG. 6 represents schematically the manufacture of a bag with a mouth closure flap, by fragmentarily showing the stock, merely as it is at the stage just prior to transverse severance of completed bags;

FIG. 7 is a perspective view of a bag manufactured by the process variation of FIG. 6;

FIG. 8 essentially schematically represents in the manner of FIG. 6 the manufacture of a further bag with modification in the closure flap;

FIG. 9 is a perspective view of the bag manufactured by the method disclosed by FIG. 8;

FIG. 10 is a schematic representation, such as FIGS. 6 and 8, of a further modification in the method of manufacturing a bag;

FIG. 11 is a perspective view of a finished bag produced by the manufacturing method of FIG. 10.

Figure 4:
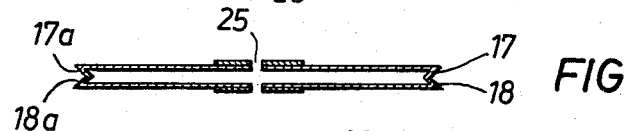
FIG. 4 is a further section taken at the line IV–IV in FIG. 2 showing a stage where two opposed finished bags have resulted.

In the synthetic thermoplastic film bag 10, the two walls 11 and 12 at the top region or mouth are provided with reinforcement strips 13 and 14 in which respectively handgrip hole cuts in the form of nonclosed, or incomplete long oval curves are incised or punched at 15 and 16 entirely through the reinforced edges, while the bag bottom is provided with bottom folds 17 and 18 such as appear in FIGS. 4 or 5. On both side edges, the bag walls 11 and 12 are bonded together through weld seams 19 and 20.

It is understood, of course, that various synthetic plastic material may be used for the tubular material, and where reinforcement is to be thermoplastic, there also; such as the various types of polyethylene, polypropylene, polyvinyl chlorides and others as now known, the gauge of the tubular plastic, or for the reinforcement being selected according to the strength desired in the bags and according to other known design and processing considerations. As previously stated, the reinforcement material may be stiffer thermoplastic stock, paper, or cardboard.

Figure 1:
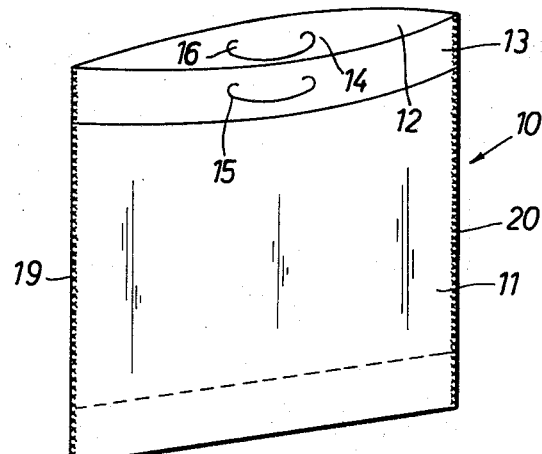
FIG. 1 is a perspective view of one form of bag produced in accordance with the present invention, such as a carrying or shopping bag.
Figure 2:
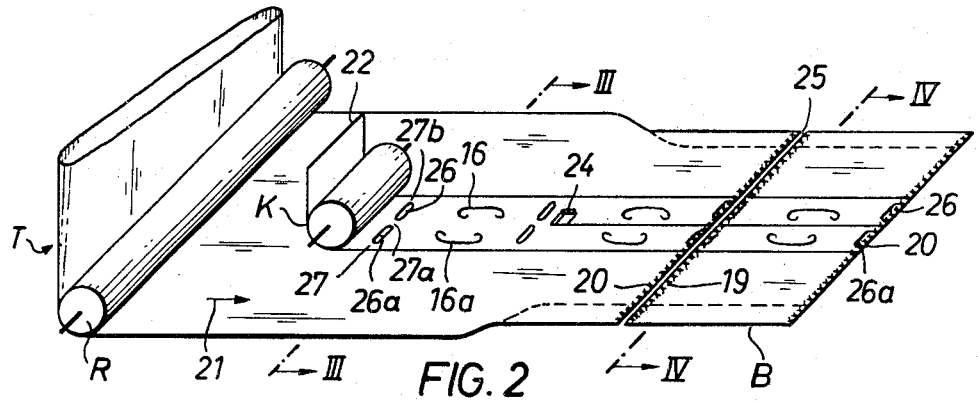
FIG. 2 represents in perspective and in essentially schematic manner a method of manufacturing the bag of FIG. 1, in accordance with the invention.

In FIG. 2 the basic features of the inventive method are disclosed in detail as applied to the manufacture of a bag having the finished structure of FIG. 1; the subsequent figures and description as to method detailing modifications from, and hence referable to, what is here shown.

Flattened tubular thermoplastic stock T from a supply source (not shown), typically a supply roll but conceivably even an extruder, is fed past the guide and flattening roll R to undergo the series of operations comprising the method, as it moves the direction as indicated by the arrow 21, here shown in horizontal disposition.

First at a laminating device and station represented by the pressure roller K, the upper one of two disposed on opposite sides of the stock web, along the middle longitudinal axis of and to both sides of the advancing tube there are applied external top face and bottom face reinforcing strips 22 and 23 (seen more clearly in FIG. 3; fed from a source or a supply roll not shown). These are bonded to the respective layers of the stock, which will become bag walls, either through thermoplastic welding or through adhesive at a lamination cementing device, here schematically represented by roller K. Thereupon there results the composite stock section of FIG. 3, wherein for clarity of representation the walls 11 and 12 are shown separated rather than in flattened contact. The two strips of flat stock provided the bands or strips 22—23, preferably before being brought adjacent the main tube stock, are provided with pairs of aligned elongated holes 26, 26a, the successive pairs spaced longitudinally along the strip stock by substantially the width of the desired product bags, for purposes to be described. Such composite stock may be produced by the steps thus far described and wound into supply rolls for further separate processing into bags.

The reinforcing strips 22 and 23 each have a width double the width of the reinforcing strips of each of the bags to be prepared, so that as the composite stock, i.e., the tube with the reinforcing strips thereto attached, advances finally past a cutting station, where the composite is cut down along the middle longitudinal axis by a knife 24, two stock reaches of like section are produced from which like bags may ultimately result.

It is especially advantageous, however, at a punching or shearing station encountered after the lamination station and previous to the longitudinal cutting station, to provide pairs of opposed mirror image disposed grip hole incisions 16–16a cut completely through (but not closed into a complete curve) the reinforcing strips and the tube walls, resulting in tabs or flaps displaceable from the hole location.

Also the respective edges of the advancing tube stock are continually folded inwardly to produce side folds 17—18 on one side and 17a—18a on the other side; this infolding being shown as completed after the longitudinal cutting, though producible at one earlier point. Finally at a thermoplastic seam-welding and cutting station, at B, two finished bags are simultaneously severed in pairs from the tube through a seam welding operation producing the transverse weld seams 19 and 20, through the common axis of holes 26, 26a, and advantageously, simultaneously, the separating cut 25 lying therebetween.

The aforementioned pairs of longitudinally aligned elongated holes 26–26a, punched or stamped out to extend transversely in the reinforcing strips 22 and 23, leave only small connections or "bridges" 27, 27a and 27b between the elongated holes themselves and the strip edges and these holes. Hence, when the transverse seam welding is made on the longitudinal axis of these elongated holelike cutouts (producing the side seams 19 of one bag pair and the opposed side seams 20 of the next bag pair produced, and the cut 25 therebetween), the transverse weld seaming with severance is simplified in actual operation, as it is ensured that even in the region of the reinforcing strips, practically speaking substantially only the two foil layers 11 and 12 are welded. Actually, of course, at the "bridges" 27, 27a and 27b there results a welding of four layers; but as this occurs at a very narrow limited localized area, it does not hinder an orderly and rapid seaming, even if 22 is paper.

The description relative to FIG. 2 shows a method of manufacturing bags with grip rim reinforcements which obviously may be carried out with very simple equipment means and with multiple advantages.

FIG. 5 shows extruded tubular stock which as starting material has already been provided with inwardly raised lands, as reinforcing strips 22 and 23, integrally extruded on the opposed layers or walls and with the side folds 17—18 and 17a—18a. Similarly this tube is cut along the longitudinal middle axis as indicated by the dot-dash line 26c, after a previous provision of the paired gripping hole incisions 16 and 16a disposed in opposed relation on both sides of the longitudinal middle axis. In processing this stock, after the longitudinal cutting, there follows the aforedescribed transverse seam welding separating two finished bags from the tube.

It is to be understood, however, that generally the reinforcing strips (whether in stock as in FIG. 5 or in prior FIGS.) for stiffening have a greater thickness than the walls as such of the tube or bag; and correspondingly the tubing side folds may also have such greater thickness, especially where the side folds are formed in the extrusion production of the tubular starting material or stock. From such stock, by this method there results a bag particularly stiffened on the upper bag edge and having a particularly stiff and supportive bottom.

When the reinforcements 22 and 23 in FIG. 5 have a thickness corresponding to the side fold thickness, then the flattened tube is precisely as thick in the middle as at the edges, so that it is easily wound up into a supply roll from which it may be later processed in bag manufacturing apparatus. This is also true where a composite stock similar to that of FIG. 3 is made up into supply rolls, and thereafter further processed by grip hole punching, longitudinally cutting and finally seaming severance.

From FIG. 6, a method of fabrication is apparent, wherein the reinforcing strips 22—23 are bonded on the upper and lower sides of the tube, symmetrically parallel to the tube axis and thus offset to one another. As the tube is advanced in the direction of the arrow 21, there are produced in the reinforcing strips and in the tube walls opposite thereto the completely punched out areas of elongated grip holes 28, as by closed curve shearing cuts through the entire composite section; while in the region of the overlapping single layer wall extensions between the strips 22—23, there are sheared or incised the grip hole cuts 15, again as in FIGS. 1—2, not made to closed curves.

Along the respective adjacent edges of the two reinforcing strips 22 and 23, at a position antecedent to the stock location shown in FIG. 6, the advancing tube has been continually longitudinally cut by respective spaced top and bottom knives, each cutting only through a respective layer or wall of the tube to produce the parallel offset upper wall cut 29 and lower wall cut 30. For purposes of simplifying the drawing in FIG. 6 production of the transverse seams 19 and 20 and other common features appearing in other figures are not represented.

The bag appearing in perspective in FIG. 7 represents the product of the FIG. 6 method. It has a mouth or gripping rim reinforcement 22 on only one of the bag walls 11. The other wall 12 has an overflap as a top closure which, when the bag is closed as shown, folds over the grip reinforcement 22, and, if desired, interlocks with the latter by displacement, into holes 28 of both walls, of the hingeable tablike portion freed by cut 15 in the closure flap 22.

By FIG. 8 there is disclosed the method expedient of applying merely a single broad reinforcing strip on only one tube layer or wall, shown as the lower wall; centrally longitudinally slitting only this reinforcing strip with its respective layer into two strips 23a, 23b, by the cutting knife 24; and by respective upper knives 24c slitting the upper layer only of the tube along two spaced cuts resulting in edges 30 and 31, giving rise to a waste strip 32 which is removed.

The lines of the cuts producing edges 30—31 occur approximately over the respective mid lines of strips 23a, 23b. In the manufacture of a bag by the method modification of FIG. 8, however, it is also possible to eliminate a production of the waste strip, and rather to utilize the corresponding material as will be subsequently described relative to FIG. 10.

The procedure of FIG. 8 produces a bag (seen FIG. 9) having an overflap or closure which itself includes a reinforcing strip. The fold line in the middle of the reinforcing strip 23a and 23b (for the respective pair of simultaneously finished bags) is weakened through a line of suitable perforations (lines 33 and 34 respectively) to facilitate folding of the reinforcing strip over the opposed edge 30 (or 31) of the bag mouth.

FIG. 10 schematically represents manufacturing of a bag with reinforcing strips 23a and 23b spaced parallel to each other on one tube side and symmetrically to the tube middle longitudinal axis. By the knife 24 the advancing tube is continually cut along its middle axis through both top and bottom sheets or layers, midway between the two reinforcing strips. In contrast to FIG. 8 there is no waste strip 32; but rather the material corresponding to waste strip 32 appears in the two upper edge margins or strips 33 and 34, which as produced are folded back outwardly onto, and through continual longitudinal seaming or welding at 35 and 36 are bonded to, the upper side of the tube top layer. The complete punchouts and incompletely incised cuts for grip openings, such as represented at 28 or 15 in FIG. 8, are preferably made after the thermoplastic seaming of folded back margins 33, 34 to the tube top wall.

At locations longitudinally spaced correspondingly to the width of the bag being prepared, also diamond-shaped punchouts 37 are made, conveniently subsequent to the folding back of portions 33—34, so that in the finished bag, the closure flap 38 is beveled on its end edges as shown, but also indicated in FIG. 7, for example, as would result from analogous punchings in the FIG. 6 method. Such holes 37 also facilitate clean severance in the seam welding operations separating the pairs of finished bags by use of even a welding arm blade extending entirely across the stock, since the holes 37 eliminate heat severance of the stock at the flap ends.

FIG. 11 shows one of the two bags (that from the top of FIG. 10) simultaneously produced by the method of FIG. 10. The front facing wall 11 has the reinforcing transverse strip 23a on the upper bag edge, i.e., on one side of the mouth, with the other mouth edge reinforced through the folded over portion 33; and the flap 38 provides the closure flap for the bag.

The tube may be fed by intermittent feeding in a continual series of like incremental advances, where required by particular devices desired to be used for particular operations of the method, such advance being here considered "continuous."

I claim:
1. A method for fabricating, from thermoplastic synthetic plastic film, carrying bags, such as shopping bags or the like, having reinforcing means disposed on one or both of the bag wall edges at the mouth of the bag with a handgrip opening punchout in the reinforcing means, said method comprising the steps of:
   providing a length of thermoplastic tubular film stock comprising a film tube flattened to a double-layered sheet with layers continuing one into the other along opposite longitudinal edges, and embodying at least one continuous longitudinal reinforcing strip disposed in the central region of at least one layer of the tube;
   longitudinally cutting and centrally dividing the tube into two like longitudinal sections each with at least one reinforcing strip parallel and proximate to the dividing cut; and
   successively severing the divided tube by like-spaced transverse seam welding and separating cuts, each successive transverse cut producing two like separate finished bags.

2. A method as described in claim 1, wherein tubular thermoplastic film flattened to a double-layered sheet and of indefinite length is advanced with reinforcing strip sheet stock being continually bonded to and in the central region of at least one layer of the tube as a continuous longitudinal reinforcing strip thereby to provide said tubular stock; the longitudinal cutting and central division being continually carried out on the advancing stock.

3. A method in accordance with claim 1 wherein a reinforcing strip is embodied in each later of the tube.

4. A method in accordance with claim 3 wherein said reinforcing strips are parallel and laterally offset from one another, and the tube is continuously longitudinally divided by longitudinally cutting the layers next to the opposed edges of the reinforcing strips.

5. A method in accordance with claim 3 wherein:
   the tube is continually longitudinally infolded on both tube edges;
   continuous reinforcement strips are bonded on both tube layers along the tube longitudinal mid axis; and handgrip holes are cut through both reinforcing strips and paired in mirror image relationship to each other on both sides of the tube longitudinal axis the tube and its reinforcing strips being cut along the longitudinal axis.

6. A method in accordance with claim 1 wherein the tubular stock is extruded with side infolds and also with reinforcing strips as inwardly raised flat lands on both layers of the tube along the longitudinal mid axis.

7. A method in accordance with claim 5 wherein on both sides of said longitudinal middle axis synthetic plastic film reinforcing strips are continually laminated to the tube.

8. A method in accordance with claim 2 wherein elongated hole cutouts through and extending substantially over the width of each reinforcing strip are cut out at locations longitudinally spaced corresponding to the width of product bags; and the transverse seam welding and severing cuts separating the finished bags from the tube are carried through the longitudinal axes of these elongated cutouts.

9. A method in accordance with claim 2 wherein spaced parallel reinforcing strips are applied on only one layer of the tube symmetrical to the tube midaxis, and free edges resulting in the other layer through the longitudinal cutting being made along the midaxis entirely through the tube are folded outwardly back onto, and are bonded onto the said other layer by longitudinally running seams.

10. A method in accordance with claim 2, wherein a portion of one layer projects beyond the reinforcement strip of the other layer after the longitudinal cutting or division to form a bag closure flap; and including the further step of forming cutouts in the flap-forming regions of the tube as inward triangular notches in the flap areas at positions longitudinally spaced by the bag width to be formed, at the positions of the subsequently to be formed transverse seam-welding and severing cuts.

11. A process in accordance with claim 3 wherein the tube layer portions with reinforcing strips and the layer portions opposed to the reinforcing strips are provided with hand grip holes respectively punched out completely or incompletely incised.